United States Patent [19]

Sato

[11] Patent Number: 5,139,214
[45] Date of Patent: Aug. 18, 1992

[54] ANTI-REVERSE MECHANISM FOR USE IN FISHING REEL

[75] Inventor: Jun Sato, Sakai, Japan

[73] Assignee: Shimano Industrial Co., Ltd., Osaka, Japan

[21] Appl. No.: 660,941

[22] Filed: Feb. 26, 1991

[30] Foreign Application Priority Data

Mar. 7, 1990 [JP] Japan ................... 2-23056[U]

[51] Int. Cl.$^5$ ............................................. A01K 89/033
[52] U.S. Cl. ................................. 242/298; 188/82.7; 242/299
[58] Field of Search ............... 242/298, 299, 300, 268; 188/82.7, 82.77

[56] References Cited

U.S. PATENT DOCUMENTS

| | | | |
|---|---|---|---|
| 996,348 | 6/1911 | Kramer | 242/300 X |
| 1,192,489 | 7/1916 | Anglada | 188/82.7 |
| 3,974,978 | 8/1976 | Menze | 242/300 |
| 4,544,114 | 10/1985 | Stauffer | 242/300 X |
| 4,708,303 | 11/1987 | Emura et al. | 242/300 |
| 5,037,039 | 8/1991 | Toda | 242/268 X |
| 5,042,741 | 8/1991 | Aota | 242/298 X |

FOREIGN PATENT DOCUMENTS

| | | | |
|---|---|---|---|
| 648394 | 9/1962 | Canada | 188/82.7 |
| 2707360 | 8/1977 | Fed. Rep. of Germany | 242/268 |

*Primary Examiner*—Daniel P. Stodola
*Assistant Examiner*—William Stryjewski
*Attorney, Agent, or Firm*—Dickstein, Shapiro & Morin

[57] ABSTRACT

A fishing reel including a take-up member for taking up a fishing line about a spool and an anti-reverse mechanism. The anti-reverse mechanism has a stopper gear for restricting rotation of the take-up member in a direction for feeding the fishing line, and a stopper claw having an engaging portion engageable with a stopper tooth of the stopper gear. The anti-reverse mechanism further includes a plurality of the stopper claws. The engaging portions are arranged with an interdistance therebetween, the interdistance being non-integer times as long as a pitch of the stopper teeth of the stopper gear.

12 Claims, 6 Drawing Sheets

ANTI-REVERSE MECHANISM FOR USE IN FISHING REEL

BACKGROUND OF THE INVENTION

1. Field of the Invention

The present invention relates to a fishing reel, and more particularly to a fishing reel including an anti-reverse mechanism having a stopper gear for restricting rotation of a take-up member for taking up a fishing line about a spool from a direction for feeding the fishing line and a stopper claw engageable with stopper teeth of the stopper gear.

2. Description of the Related Art

As disclosed in e.g. a Japanese laid-open utility model gazette No. 62-97570, in a fishing reel of double-bearing type or a spinning reel type, the stopper gear for preventing the rotation of the take-up member in the line feeding direction is mounted on a drive shaft for driving this take-up member. Whereas, the stopper claw engageable with the stopper teeth of the stopper gear is projectably attached to a reel body which rotatably supports the take-up member. In operation, when the take-up member is driven by rotation of a handle through the drive shaft in a forward direction for taking up the fishing line, the stopper claw is raised relative to the stopper gear to release this stopper gear thus allowing the forward rotation of the take-up member for taking up the line about the spool. On the other hand, when the take-up member is reversely rotated in a direction for feeding the fishing line by means of load acting on this line, the stopper claw comes into engagement with one of the stopper teeth of the stopper gear thereby restricting this reverse rotation of the take-up member.

However, with the conventional fishing reel, its anti-reverse mechanism consists essentially of a single stopper gear and a single stopper claw as described above. For this reason, a play amount of the take-up member, i.e. the distance between a point where the take-up member starts the reverse rotation and a further point where the member stops this reverse rotation through the engagement between the stopper claw and the tooth of the stopper gear, is maximum in case the stopper claw is positioned farthest from the stopper tooth. In this case, the maximum play stroke of the take-up member substantially equates with a pitch of the stopper teeth. Moreover, for assuring sufficient physical strength of the stopper teeth, it is preferred that the pitch of the stopper teeth having the above-described construction be as large as possible. In such case, the large teeth pitch results in further increase in the play amount of the take-up member.

The present invention attends to the above-described problem of the convention. Thus, the primary object of the invention is to provide a fishing reel with improvement which achieves reduction in the maximum play amount of the take-up member while allowing a sufficiently large pitch for the teeth of the stopper gear.

SUMMARY OF THE INVENTION

For accomplishing the above-noted object, a fishing reel according to the present invention comprises: a take-up member for taking up a fishing line about a spool; and an anti-reverse mechanism including; a stopper gear for restricting rotation of the take-up member in a direction for feeding the fishing line, and a stopper claw having an engaging portion engageable with a stopper tooth of the stopper gear; wherein the anit-reverse mechanism includes a plurality of said stopper claws, said engaging portions being arranged with an interdistance therebetween, said interdistance being non-integer times as long as a pitch of said stopper teeth of the stopper gear. Functions and effects of this construction will be described next.

When the take-up member is forwardly rotated in the line take-up direction, all the engaging portions of the stopper claws disengage from the stopper teeth of the stopper gear, thereby allowing the fishing line to be wound about the spool. On the other hand, when the take-up member is reversely rotated in the line feed direction due to load acting on the fishing line, an engaging portion of one of the stopper claws comes into engagement with a stopper tooth of the stopper gear, thereby preventing further reverse rotation of the take-up member. Further, in the latter-mentioned case, according to the invention, the anti-reverse mechanism includes a plurality of the stopper claws and also these stopper claws are disposed with an interdistance which is non-integer times as long as the pitch of the stopper teeth. Therefore, an engaging portion of one of the stopper claws comes into engagement with a stopper tooth positioned adjacent the engaging portion in the reverse rotation direction before the stopper gear effects rotation which amount corresponds to one pitch of the stopper teeth thereof. With these features of the invention, even if the stopper teeth are provided with a sufficiently large pitch, it is possible to minimize the maximum play amount of the stopper gear from its reverse-rotation starting position and its reverse-rotation stopped position. This means that the construction can stop the reverse rotation of the stopper gear very quickly.

As described above, the invention has fully achieved the object of providing a fishing reel with improvement which achieves reduction in the maximum play amount of the take-up member while allowing a sufficiently large pitch for the teeth of the stopper gear.

Further and other objects, features and effects of the invention will become more apparent from the following more detailed description of the embodiments of the invention with reference to the accompanying drawings.

DESCRIPTION OF THE PREFERRED EMBODIMENTS

Figure 1:
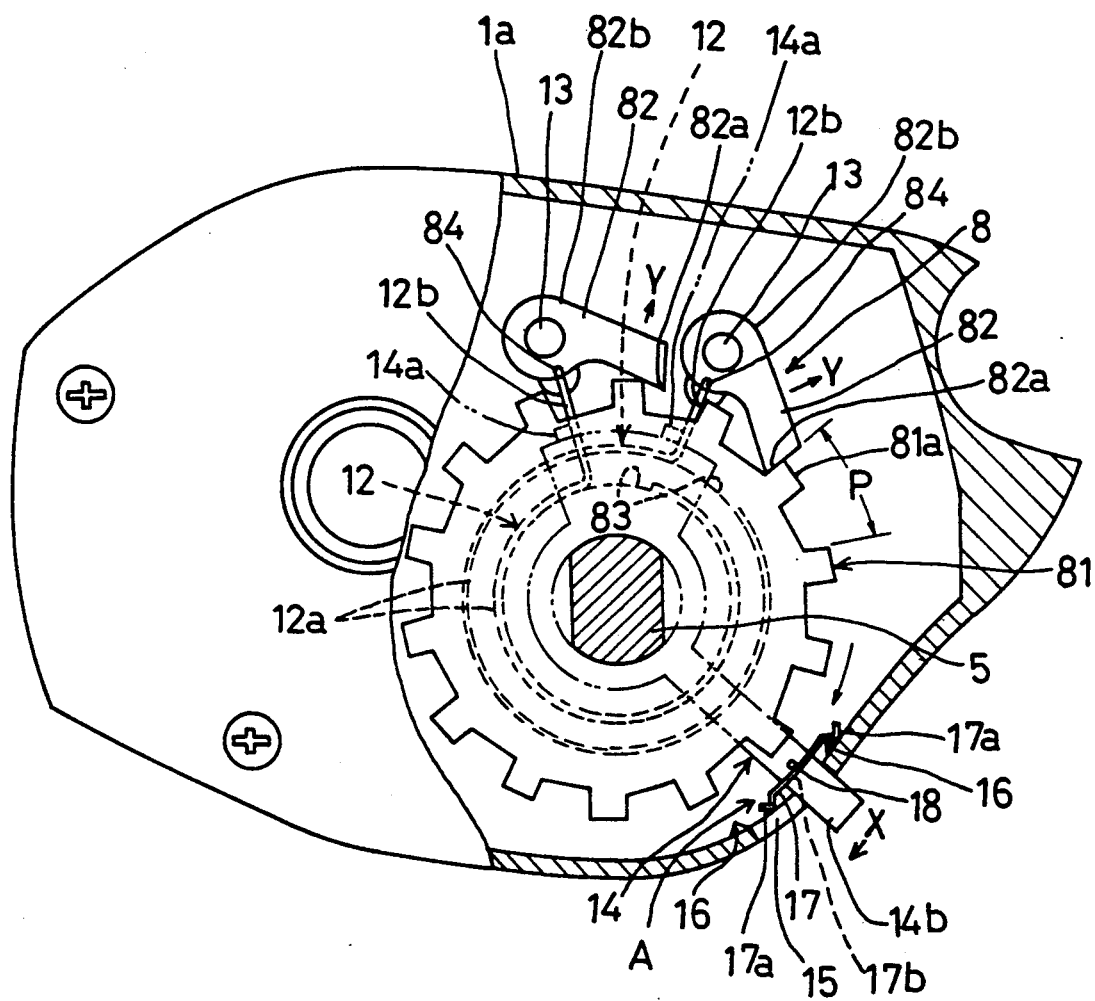
FIG. 1 is a partially cutway side view in vertical section showing a fishing reel according to one preferred embodiment of the present invention.

Preferred embodiments of a fishing reel relating to the present invention will now be described in particular with reference to the accompanying drawings.

As shown in FIGS. 1 through 7, a double-bearing type fishing reel relating to one preferred embodiment of the invention includes a reel body 1 having an opposed pair of side frames 1a, 1b, and a take-up member 3 fixedly mounted on a spool shaft 2 for taking up a fishing line about a spool, with the spool shaft 2 being rotatably supported to the reel body 1. Further, a drive shaft 5 rotatable by means of a handle 4 is disposed in parallel with the spool shaft 2. This drive shaft 5 mounts a main gear 6 while the above-mentioned spool shaft 2 mounts a pinion gear 7 meshing the main gear 6. In operation, rotational force of the drive shaft 5 is transmitted through the main gear 6, the pinion gear 7 and the spool shaft 2 to the take-up member 3.

Figure 3:
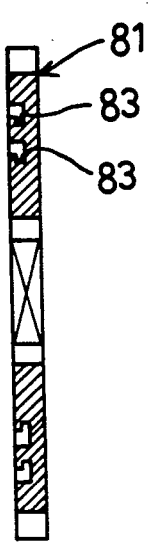
FIG. 3 is a section showing a stopper gear alone.
Figure 4:
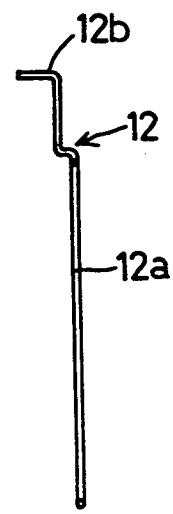
FIG. 4 is a section showing a clutch spring alone.
Figure 5:
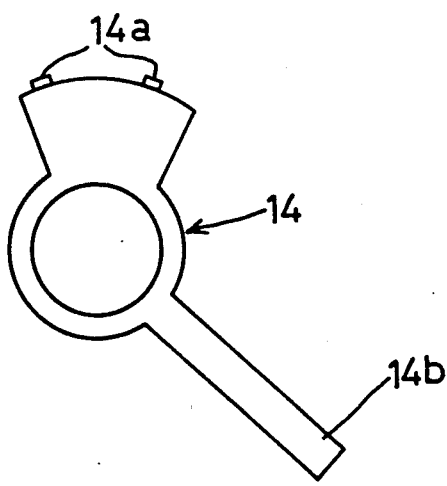
FIG. 5 is a side view showing a switch lever alone.
Figure 6:
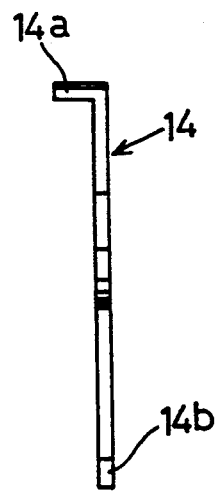
FIG. 6 is a side view of the switch lever shown in FIG. 5.
Figure 7:
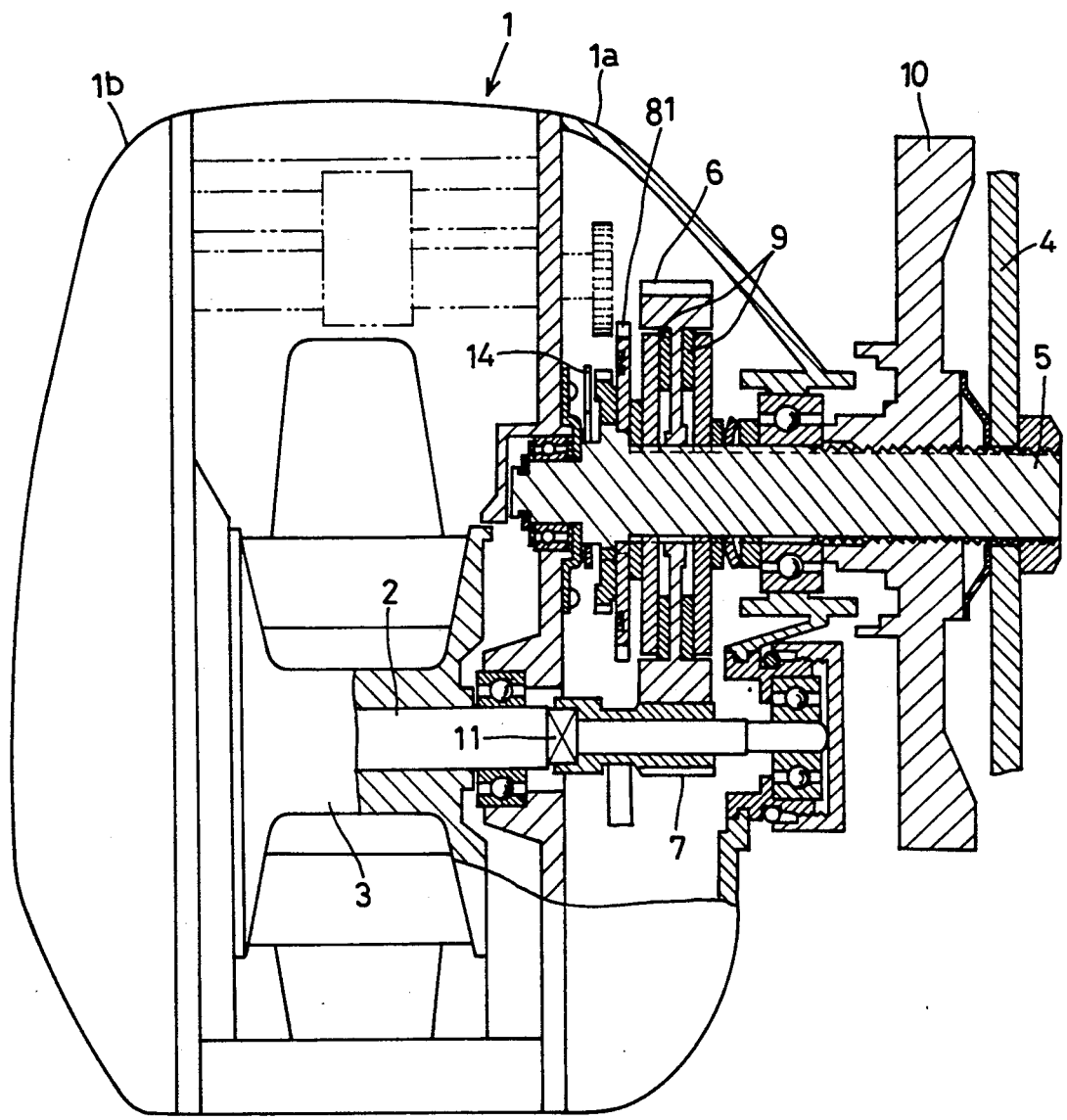
FIG. 7 is a partially cutaway plan view in section showning the entire fishing reel.

The drive shaft 5 also mounts a stopper gear 81 for restricting reverse rotation of the take-up member 3 in a direction for feeding the fishing line. FIG. 3 shows a section oif this stopper gear 81. On the other hand, to the first side frame 1a, there is attached a stopper claw 82 swingable from the side frame 1a to come into engagement with one of stopper teeth 81a of the stopper gear 81. The stopper gear 81 and the stopper claw together constitute an anti-reverse mechanism 8. In operation, as the stopper claw 82 and the stopper gear 81 come into engagement with each other, the reverse rotation of the take-up member 3 in the line feed direction is restricted. On the other hand, when the claw 82 and the gear 81 disengage from each other, the take-up member 3 becomes rotatable in the line feed direction.

The stopper claw 82 includes an engaging portion 82a engageable with the stopper tooth 81a and a boss portion 82b formed continuous with the engaging portion 82a and swingably supported via a swing shaft 13 to the first side frame 1a.

The main gear 6 is rotatable relative to the drive shaft 5. Between this main gear 6 and the drive shaft 5, there is interposed a drag adjustment mechanism for applying a braking force to rotation of the main gear 6. More specifically, the mechanism includes drag braking plates 9 and a drag adjustment member 10 screwed to an end of the drive shaft 5. In operation, as this adjustment member 10 is rotated, the drag braking plates 9 are pressed to apply a predetermined resistance to the rotation of the main gear 6.

On the other hand, the pinion gear 7 is freely rotatable and axially slidable relative to the spool shaft 2. Between this pinion gear 7 and the spool shaft 2, there is interposed a clutch 11 operable by an unillustrated clutch lever. In operation, as this clutch lever is operated, through an unillustrated clutch yoke, the pinion gear 7 is axially slided on the spool shaft 2 thereby controlling the clutch 11.

Then, in this particular embodiment shown in FIGS. 1 through 8, the construction includes two of the stopper claws 82. And, the engaging portions 82a of these stopper claws 82 engageable with the stopper teeth 81a are arranged with such an interdistance therebetween that is non-integer times as long as a pitch P of the stopper teeth 81a of the stopper gear 81. With this arrangement, one engaging portion 82a of either one of the stopper claws 82 comes into engagement with one stopper tooth 81a positioned adjacent this engaging portion 82a in the reverse rotation direction before the stopper gear 81 effects rotation which amount corresponds to one pitch of the stopper teeth 81a thereof.

Figure 2:
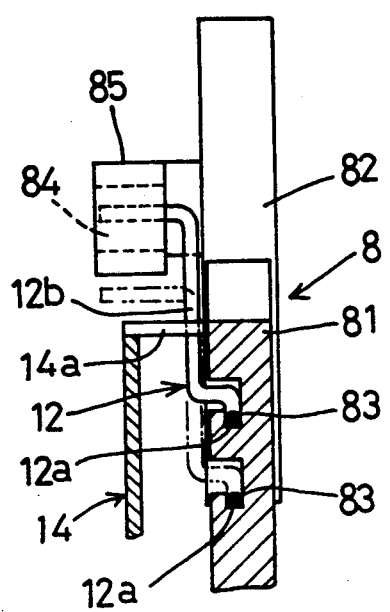
FIG. 2 is an enlarged section showing major portions alone.

More particularly, the engagement and disengagement between each stopper claw 82 and the stopper teeth 81a is effected by means of two ring-shaped clutch springs 12 operable in association with forward and reverse rotations of the stopper gear 81. Each clutch spring 12, as shown in detail in FIG. 4, includes a ring portion 12a and a leg portion 12b flexed in a radial outward direction from an end of the ring portion 12a. Further, the ring portion 12a of one clutch spring 12 has a radius greater than the ring portion 12a of the other clutch spring 12. Such that, as shown in FIG. 2, these ring portions 12a, 12a are lightly fitted, through their inner peripheries, into corresponding large and small annular grooves 83, 83 defined in one lateral face of the stopper gear 81. On the other hand, the leg portions 12b, 12b are hooked at elongated spring hook holes 84 defined in the respective stopper claws 82.

Figure 8:
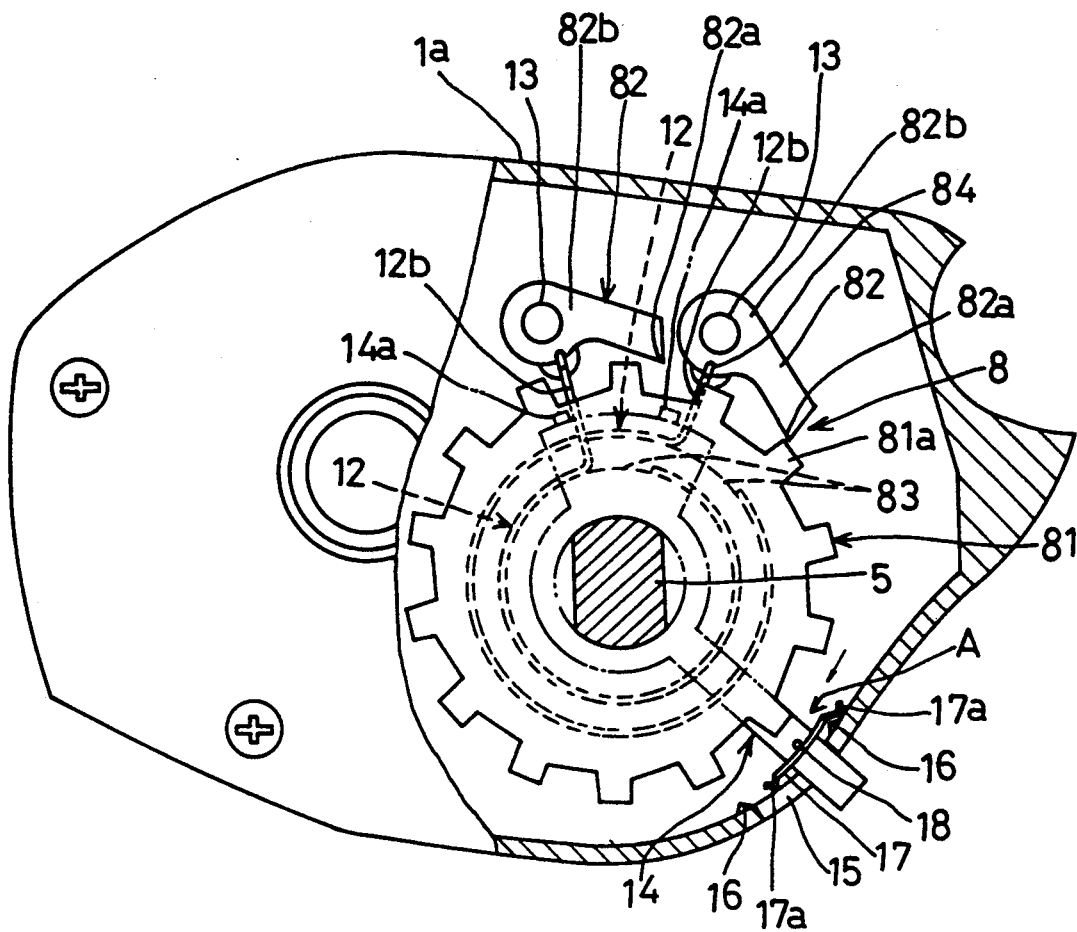
FIG. 8 is an explanatory view illustrating operating conditions of the reel.

In operation, when the stopper gear 81 is forwardly rotated in the line take-up direction, frictional contact between the stopper gear 81 and the ring portions 12a slightly rotate the clutch springs 12. Then, as illustrated in FIG. 8, the stopper claws 82 are raised to completely disengage from the stopper gear 81. Whereas, the ring portions are radially extended to effect sliding motion relative to the stopper gear 81 thereby stopping the co-rotation between the clutch springs 12 and this stopper gear 81.

On the other hand, when the stopper gear 81 is reversely rotated in the line feed direction, frictional resistance between the stoppr gear 81 and the clutch springs 12 causes the ring portions 12a to contract radially, which results in co-rotation of the clutch springs 12. Then, as illustrated in FIG. 1, the stopper claws 82 are depressed and either of these stopper claws 82 comes into engagement with the stopper tooth 81a, whereby the reverse rotation of the stopper gear 81 is limited. Further, each stopper claw 82, at one side of its boss portion 82b, integrally includes a projecting spring hook piece 85 having the aforementioned spring hook hole 84.

Each stopper claw 82 is switchable over to a non-engaging position by operation of a switch lever 14 (see FIGS. 5 and 6) swingably mounted on the drive shaft 5. More particularly, this switch lever 14 includes a pair of engaging projections 14a and a control portion 14b extending outwardly through an elongated guide slot 15 defined in the side frame 1a. In operation, as this switch lever 14 is pushed in a direction of an arrow X in FIG. 1, the clutch springs 12 are slided relative to the stopper gear 81 so as to raise the stopper claws 82 in a further direction of an arrow Y in FIG. 1, thus switching the stopper claws 82 over to the non-engaging positions detached from the stopper teeth 81a.

Further, between the switch lever 14 and an inside face of the side frame 1a, there is provided a positioning mechanism A for maintaining the position of the switch lever 14. This positioning mechanism A includes a projection 16 defined on the inside face of the side frame 1a and a plate spring 17 having an engaging portion 17a and an engaging hole 17b both engageable with the projection 16. The engaging hole 17b of this plate spring 17 is fitted into the control portion 14b of the switch lever 14 and maintained by a retainer pin 18 attached to the switch lever 14. Then, with an operation of the switch lever 14, the engaging portion 17a moves over the projection 16 thereby to maintain the operational position of the switch lever 14.

Next, overall operations of the fishing reel having the above-described construction will be described.

When the take-up member 3 is forwardly rotated in the line feed direction through manual rotation of the handle 4, the stopper gear 81 together with the drive shaft 5 effects forward rotation (i.e. rotation in the direction of clockwise arrow shown in FIGS. 1 and 8). With this forward rotation of the stopper gear 81, the clutch springs 12 are slightly rotated therewith. As a result, as illustrated in FIG. 8, the stopper claws 12 are raised such that the engaging portions 82a of these stopper claws 12 are completely disengaged from the stopper teeth 81a. Accordingly, the take-up member 3 can be rotated in the forward direction to take up the fishing line about the spool. Moreover, since the engaging portions 82a of the stopper claws 82 are completely disengaged from the stopper teeth 81a and therefore the claws will not rise up at all, the above-described line take-up operation takes place very smoothly and noiselessly without any engaging noise occuring from the anti-reverse mechanism 8.

Under the above-described, complete disengagement between the engaging portions 82a of the stopper claws 82 and the stopper teeth 81a, if the take-up member 3 is reversely rotated in the line feed direction due to load acting on the fishing line, the stopper gear 81 is also rotated reversely together with the take-up member 3 and the drive shaft 5. Then, with this reverse rotation of the stopper gear 81, the ring portions 12a of the clutch springs 12 are radially contracted so that the clutch springs 12 rotate together with the stopper gear 81. As a result, as illustrated in FIG. 1, the stopper claws 82 are depressed. In the course of this, since the engaging portions 82a of the stopper claws are arranged with such interdistance therebetween that is non-integer times as long as the pitch P of the stopper teeth 81a of the stopper gear 81, one engaging portion 82a of either one of the stopper claws 82 comes into engagement with one stopper tooth 81a positioned adjacent this engaging portion 82a in the reverse rotation direction before the stopper gear 81 effects rotation which amount corresponds to one pitch of the stopper teeth 81a thereof.

Accordingly, even if the pitch P of the stopper teeth 81a is large to assure sufficient physical strength of the stopper gear 81, it is possible to minimize the maximum play amount of the stopper gear 81 from its reverse-rotation starting position and its reverse-rotation stopped position. More particularly, as shown in FIG. 1, even when the engaging portion 82a of the rear (relative to the reverse rotation direction) stopper claw 82 is positioned slightly beyond its engaging position with the stopper teeth 81a, the engaging portion 82a of the other forward stopper claw 82 comes into engagement with the stopper tooth 81a before establishment of engagement between the former-mentioned engaging portion and the tooth 81a. Consequently, the maximum play amount can be minimized as described above.

On the other hand, if the switch lever 14 is pushed in the direction of the arrow X in FIG. 1, the clutch springs 12 are slided relative to the stopper gear 81 so as to raise the stopper claws 82 in the direction of the arrow Y in FIG. 1, thus switching the stopper claws 82 over to the non-engaging positions detached from the stopper teeth 81a. And, with the above-described construction of the switch lever 14, regardless of the number of the stopper claws 82 employed and of peripheral positions of the claws 82 relative to the stopper gear 81, these stopper claws 82 may be reliably switched over between the non-engaging positions and the engaging-positions.

Some other embodiments of the present invention will be described next.

Figure 9:
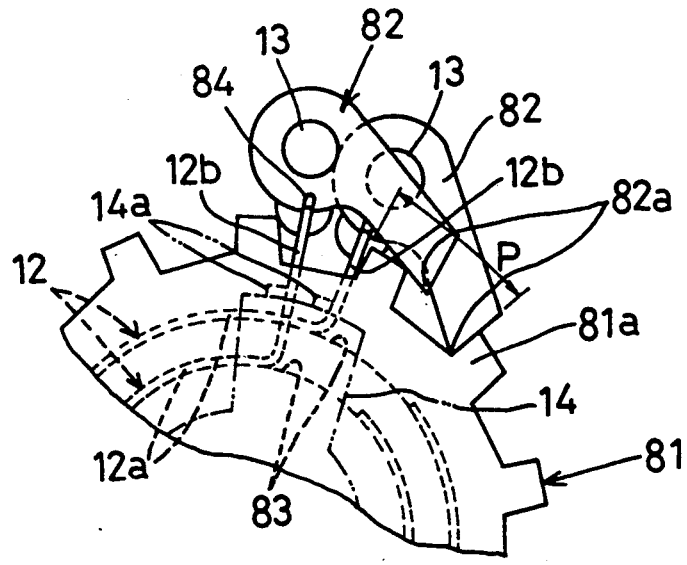
FIG. 9 is a partially enlarged view showing a further embodiment of the invention.
Figure 10:
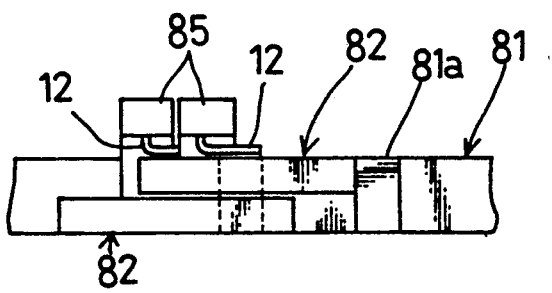
FIG. 10 is a plan view of the embodiment of FIG. 9, and FIGS. 11 through 13 are explanatory views showing still further embodiments of the invention, respectively.

In the foregoing embodiment, the stopper claws, as shown in FIG. 1, are disposed with the predetermined interdistance therebetween along the periphery of the stopper gear 81, with the interdistance being greater than the pitch P of the stopper teeth 81a. Instead, as shown in FIGS. 9 and 10 for example, it is conceivable to dispose the stopper claws 82 such that the claws 82 partially overlap with each other relative to the axis of the stopper gear 81 as viewed from the direction of the swing pivot and that the engaging portions 82 of these stopper claws 82 are positioned within the pitch of the stopper teeth 81a.

Figure 11:
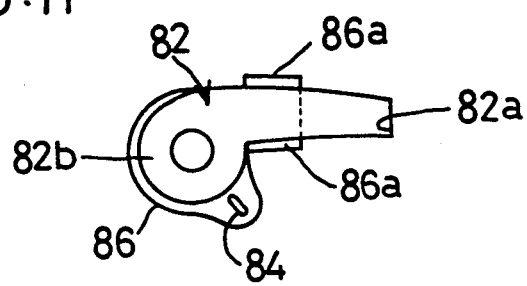

In each stopper claw 82 used in the foregoing embodiment, the spring hook piece 85 having the spring hook hole 84 is integrally projected from one end of the boss portion 82b. Instead, as shown in FIG. 11, it is also conceivable to attach e.g. a plate-like spring hook element 86 by means of a pair of holder pieces 86a holding the element 86 therebetween. With this arrangement, it becomes unnecessary to form the spring hook hole directly in the stopper claw 82.

Figure 12:
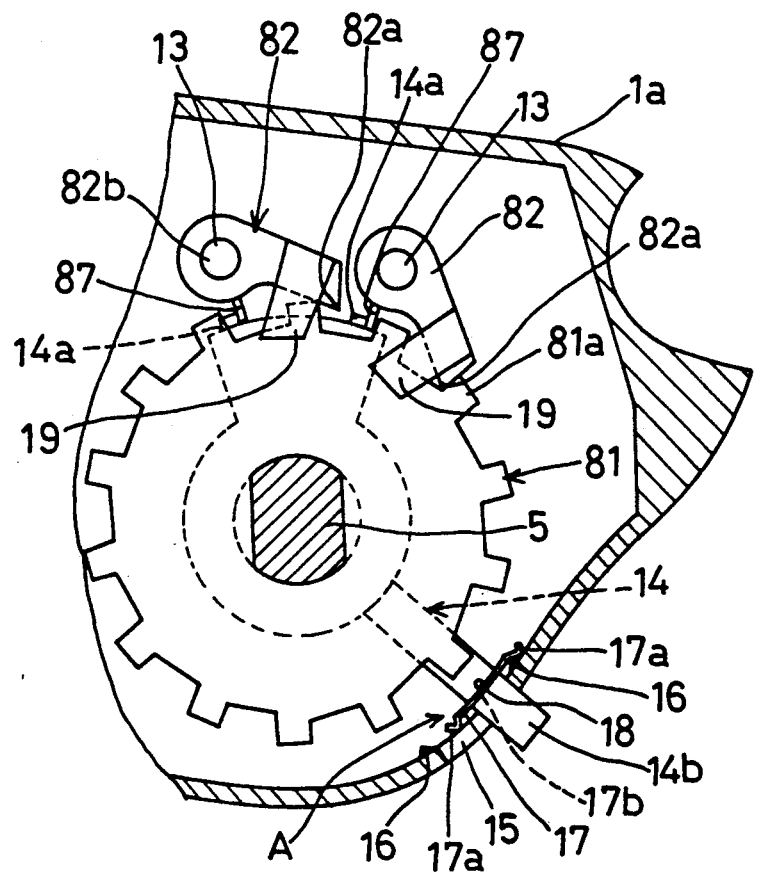

In the embodiment of FIG. 1, the clutch springs 12 are used for raising and depressing the stopper claws 82 so that no engaging noise occurs from the anti-reverse mechanism 8 during forward rotation of the take-up member 3. Alternately, as shown in FIG. 12, a pair of friction plates 19 may be employed. More particularly, in this construction of FIG. 12, at the sides of the engaging portion 82a of the stopper claw 82, there are attached a pair of the friction plates 19 facing the opposing sides of the outer periphery of the stopper gear 81. As a result, during reverse rotation of the stopper gear 81, the stopper claws 82 are slided through the friction plates 19 in the direction to come into engagement with the stopper gear 81. Whereas, during forward rotation of the stopper gear 81, the stopper claws 82 are swung through the friction plates 19 in the opposite direction departing from the stopper gear 81. In this case too, no engaging noise occurs from the anti-reverse mechanism 8 during the forward rotation of the take-up member 3, like the foregoing construction using the clutch springs 12 for the same purpose. Further, in the construction of FIG. 12 as well, the stopper claws 82 are rendered switchable between the engaging positions and the non-engaging positions by means of the switch lever 14. Incidentally, in this construction of FIG. 12, each stopper claw 82 has an abutment 87 which comes into abutment against the engaging portion 14a of the switch lever 14.

Further, instead of using the clutch springs 12 or the friction plates 19, it is also conceivable to use an unillustrated claw spring for constantly urging the stopper claws 82 toward the stopper gear 81.

Figure 13:
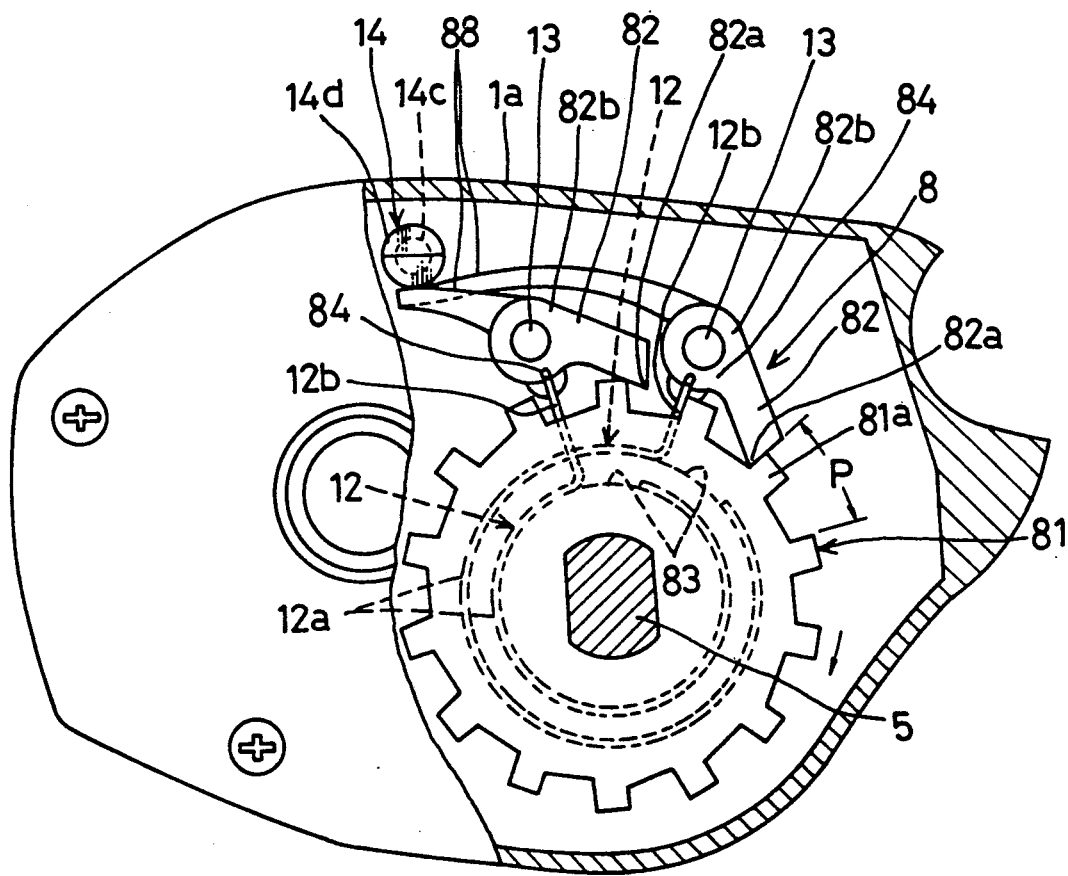

Moreover, in the foregoing embodiment shown in FIG. 1, the stopper claws 82 are rendered switchable between the engaging positions and the non-engaging positions by means of the switch lever 14 swingably mounted on the drive shaft 5. Alternately, as shown in FIG. 13 for example, the switch lever 14 may be swingably attached to the side frame 1a. More particularly, in this case, the switch lever 14 includes a shaft portion 14c having a control portion controllable from the outside of the side frame 1a and a cam portion 14d projecting into the side frame 1a. And, the shaft portion 14c is rotatably supported to the side frame 1a. On the other hand, at an end of the boss portion 82b of each stopper claw 82, there is provided a projecting arm piece 88 extending in the opposite direction to the engaging portion 82a and engageable with the cam portion 14d. In operation, as the switch lever 14 is operated, the position of the cam portion 14d relative to the arm piece 88 is varied so as to switch over the stopper claws 82 between the engaging positions and the non-engaging positions.

All the above-described embodiments relate to a double-bearing type fishing reel having the take-up member 3 comprising a spool. Instead, the present invention is applicable also to a spinning type reel having a take-up member 3 comprising a rotary frame so that a fishing line is wound about a spool through rotation of this take-up member 3. Moreover, the present invention is applicable also to a single-bearing type fishing reel having a take-up member comprising a spool.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An anti-reverse mechanism for use in a fishing reel having a take-up member for taking up a fishing line about a spool, said anti-reverse mechanism comprising:
    a stopper gear for restricting rotation of the take-up member in a direction for feeding the fishing line, said stopper gear having stopper teeth; and
    at least first and second stopper claws having first and second engaging portions, respectively, said engaging portions being engageable with said stopper teeth, said engaging portions of said stopper claws being arranged with an interdistance therebetween, said interdistance being non-integer times as long as a pitch of said stopper teeth of the stopper gear; and
    moving means for moving said engaging portions of said stopper claws toward said stopper teeth to engage with said stopper teeth to prevent said stopper gear from rotating in a first direction, and for moving said engaging portions of said stopper claws away from said stopper teeth when said stopper gear rotates in a second direction, said second direction being opposite to said first direction, wherein said moving means comprises first and second clutch springs for actuating said first and second stopper claws, respectively, wherein said first and second clutch springs comprise first and second ring-shaped portions, respectively, and wherein said clutch springs operate by sliding said ring-shaped portions relative to said stopper gear; and
    wherein the diameter of said first ring-shaped portion is greater than the diameter of said second ring-shaped portion, and wherein said first and second ring-shaped portions of said clutch springs are arranged substantially in a common plane.

2. A mechanism as defined in claim 1, wherein said first stopper claw includes a boss portion formed continuous with said first engaging portion and swingably supported via a swing shaft to a side frame forming a reel body.

3. A mechanism as defined in claim 2, wherein said first clutch spring has a leg portion flexed in a radial outward direction from an end of said first ring-shaped portion, wherein said radial outward direction is perpendicular to the axis of said first ring-shaped portion.

4. A mechanism as defined in claim 3, wherein said first stopper claw integrally includes, at a side of said boss portion thereof, a projecting spring hook piece having a spring hook hole.

5. A mechanism as defined in claim 4, wherein first said stopper claw is switchable to a non-engaging position by means of a switch lever.

6. A mechanism as defined in claim 5, wherein said switch lever includes a pair of engaging projections engageable with said leg portion and a control portion extending outwardly through an elongated guide slot defined in the side frame (1a).

7. A mechanism as defined in claim 6, wherein between said switch lever and an inside face of said side frame, there is provided a positioning mechanism for maintaining the position of said switch lever.

8. A mechanism as defined in claim 5, wherein said switch lever includes a shaft portion having a control portion controllable from an outside of said side frame and a cam portion projecting into said side frame, said shaft portion being rotatably supported to said side frame.

9. A mechanism as defined in claim 8, wherein at an end of said boss portion, there is provided a projecting arm piece extending in the opposite direction to said first engaging portion and engageable with said cam portion; with operation of said switch lever, a position of said cam portion relative to said arm piece being varied so as to switch over said stopper claws between engaging positions and non-engaging positions.

10. A mechanism as defined in claim 2, wherein at a side of said boss portion, a spring hook element having a spring hook hole is attached by means of a pair of holder pieces holding said spring hook piece therebetween, said holder pieces being provided separately from said boss portion.

11. A mechanism as defined in claim 1, wherein said claws partially overlap with each other relative to an axis of said stopper gear as viewed from a direction of swing axes thereof.

12. A mechanism as defined in claim 1, wherein at sides of said engaging portion, there are attached a pair of the friction plates facing opposing sides of an outer periphery of said stopper gear; during reverse rotation of said stopper gear, said stopper claws being slided through said friction plates in a direction to come into engagement with said stopper gear; during forward rotation of said stopper gear, said stopper claws being swung through said friction plates in the opposite direction departing from said stopper gear.

* * * * *